United States Patent Office 3,285,918
Patented Nov. 15, 1966

3,285,918
1',4',5',6'-TETRAHYDROPYRIMIDINO[a-4,3]-4-
AZA-5-CHOLESTENE
Norman J. Doorenbos, North Linthicum, and Mu Tsu Wu,
Baltimore, Md. (both of 1500 Spring Garden St.,
Philadelphia, Pa.)
No Drawing. Filed Apr. 18, 1962, Ser. No. 188,563
1 Claim. (Cl. 260—251)

This invention relates to heterocyclic steroids and processes for their preparation. More particularly this invention pertains to steroids having a tetrahydropyrimidino ring fused to the A ring.

The compounds of the present invention have the fundamental steroid nucleus such as is found in the pregnane, androstane or cholestane structures, but are characterized by having the following structure in the A and B rings:

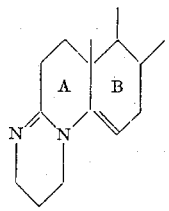

I

The remainder of the steroid nucleus may be substituted at C–17 so as to comprise the pregnane, androstane or cholestane structures. Additional substitution at other positions such as C–6, C–9, C–11 and C–16 can also be present without departing from the scope of this invention.

In particular, the following fundamental nuclei are embraced within our invention without reference to the specific substitution elsewhere in the nucleus:

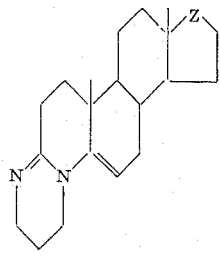

II in which Z may represent the known androstane structures; i.e., a keto group or a hydroxyalkylene group. In such instances the alkyl group embraces hydrocarbon chains of from one to four carbon atoms, inclusive of the C–17 carbon atom. Thus embraced are such structures at C–17 as 17-keto, 17-hydroxy, 17α-methyl-17β-hydroxyl, 17α-ethyl-17β-hydroxy, and the like.

Z may also be the three carbon keto moiety of the pregnane series. This side chain may be optionally substituted with one or two hydroxy groups, thereby embracing the structures of progesterone, 17α-hydroxy-progesterone and the 17α,21-dihydroxy-20-ketone corticopregnanes. Similarly Z may be one of the hydrocarbon side chains found in phytosterols or the cholestanes. Alternatively this side chain may be the alkanoic acid side chain of the bile acids. It will be apparent hereafter that the nature of this side chain is relatively unimportant in the successful execution of the major transformations in the A ring.

There may also be present additional groups elsewhere in the particular steroid nucleus as for example 11-keto or 11-hydroxy, 9-halogeno such as fluoro, 9,11-dihalogeno, 16-lower alkyl and the like. These groups may be of either the α or β configurations known to the art.

It will be seen that this invention thus pertains to a novel steroidal structure characterized by a tetrahydropyrimidino group fused to the 3- and 4-positions of the A ring, the carbon atom normally found in the 4-position being replaced by a nitrogen atom. Depending on the particular nuclei, these compounds exhibit activity analogous to that exhibited by the corresponding 3-keto-Δ⁴-dehydrosteroids.

It will be further understood that, by virtue of this invention, the preparation of an entirely new series of steroids embracing this novel structure is thus possible by employing chemical modifications analogous to those known for the classical steroid nucleus.

Surprisingly the presence of the tetrahydropyrimidino group in our compounds imparts in certain instances, additional specific activities to particular steroid structural series that heretofore have not been characteristic of that series. Thus for example, certain of our compounds which have the androstane and/or cholestane structure have been found to possess anti-inflammatory activity.

The compounds of the present invention may be prepared by ozonolysis of a 3-keto-Δ⁴-dehydrosteroid so as to form the corresponding 3,5-seco-4-nor-5-keto-3-oic acid steroid. This oxidation step is analogous to similar procedures known to the art as, for example, Turner, JACS, 72, 579 (1950). Alternatively, other oxidizing agents such as potassium permanganate or potassium iodate may be employed.

The resultant keto acids, however, are then treated with a 1,3-propanediamine, thereby forming the desired pyrimidino steroid. While various inert organic solvents can be used, the reaction is preferably executed by heating the keto acid directly with 1,3-propanediamine, employing the latter reagent as the solvent. The reaction can thus be advantageously executed at the reflux temperature of the diamino compound, preferably under an inert atmosphere such as nitrogen. Generally the mixture is heated for a period of from one to four hours and the resultant product then isolated either by distillation of the excess 1,3-propanediamine or by dilution of the reaction mixture with an appropriate solvent so as to cause separation of the product. These reactions may be represented as follows without reference to the specific substitution elsewhere in the nucleus:

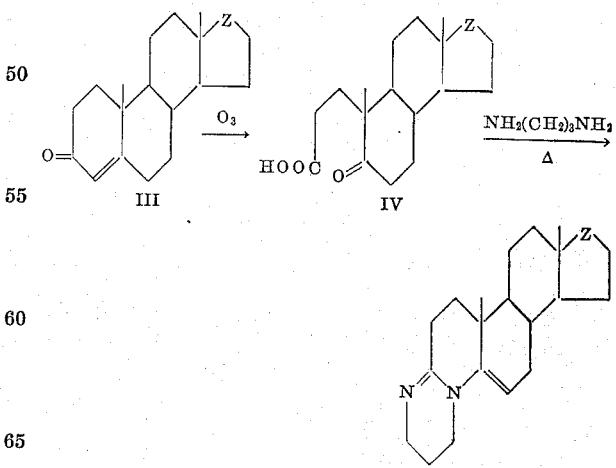

Any 3-keto-Δ⁴-dehydrosteroid known to the art may thus be employed in the present invention with the proviso that the only double bond reactive to ozone is that between C–4 and C–5. Such a limitation, however, applies only to the ozone oxidation step. The presence of such a group in an appropriate 5-keto-3-oic acid does not affect the key cyclization step. The presence of other substituents similarly does not affect the nature or course of this reaction except as indicated herein. The above described starting materials are widely known and readily available due to the physiological activity usually associated with the 3-keto-$\Delta^4$-dehydro system.

In those instances where a carbonyl group is present at C-20, it is often desirable to eliminate any excess propanediamine reagent prior to cyclization so as to prevent the formation of a Schiff base at C-20. Furthermore, improved yields can be realized when the requisite keto acid is first converted to the corresponding enol lactone by dehydration and this enol lactone then employed in the reaction with 1,3-propanediamine. This reaction can then be carried out at or below 25° C. thereby minimizing Schiff base formation. The reaction mixture is extracted with water to remove the unreacted amine and then heated as heretofore described to complete formation of the tetrahydropyrimidine ring. These modifications may be represented as follows without reference to any other specific substitution in the nucleus:

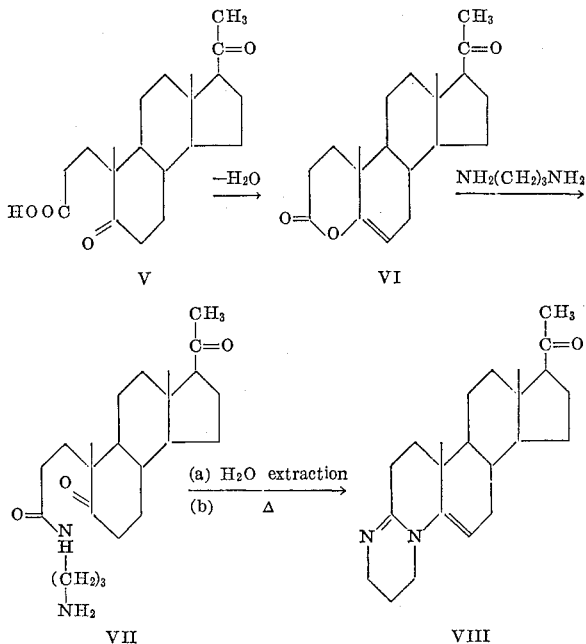

The tetrahydropyrimidino steroid formed according to our process may also be reduced to the fully saturated hexahydropyrimidino compound by treatment with a bimetallic hydride such as for example, lithium aluminum hydride or sodium borohydride.

It will be apparent from the foregoing that the 1,3-propanediamine may itself be substituted in its methylene chain, as for example by lower alkyl, an aromatic group, halogen and the like. Furthermore, the length of the alkylene chain in the diamine compound may be varied such as by employing ethylenediamine to yield the corresponding dihydroimidazole steroid.

The following will serve as a further exemplification of the products and processes of our invention, but should not be construed as a limitation thereof, the invention being defined solely by the appended claims.

*Example 1*

Two grams of cholestenone are dissolved in 30 ml. of ethyl acetate and 30 ml. of glacial acetic acid and the mixture cooled to −10° C. by use of a salt-ice bath. Ozone is then bubbled through the mixture until two molar equivalents have been introduced. There is then added 10 ml. of water and 1 ml. of 30% hydrogen peroxide and the mixture allowed to stand at room temperature for 18 hours. A substantial portion of ether is added and the solution then washed with water. The washed aqueous solution of sodium hydroxide and the combined alkaline extracts then acidified with dilute hydrochloric acid. The solid which forms is collected by filtration, dissolved in ether and washed successively with water and a saturated aqueous solution of sodium chloride. This washed solution is dried over sodium sulfate and concentrated. The addition of hexane then causes a solid to form which is collected by filtration and dried to yield 3,5-seco-4-norcholestane-5-one-3-oic acid.

A mixture of 2.0 g. (0.005 mole) of 3,5-seco-4-norcholestane-5-one-3-oic acid and 10 g. (0.14 mole) of 1,3-propanediamine is refluxed under nitrogen for one hour. At the end of this time, the mixture is distilled to remove excess 1,3-propanediamine. The resultant product formed upon cooling is crystallized from ether-acetonitrile solution to yield 1',4',5',6'-tetrahydropyrimidino[a-4,3]-4-aza-5-cholestene, which may be further purified by recrystallization from acetonitrile.

*Example 2*

17α-methyltestosterone is subjected to ozone oxidation as described in Example 1 and upon completion of steps therein described there is thus obtained the compound 17α-methyl-3,5-seco - 4 - norandrostane-17β-ol-5-one-oic acid. A mixture of 1.5 g. (0.0047 mole) of this compound and 10 g. (0.14 mole) of 1,3-propanediamine are refluxed for three hours under an atmosphere of nitrogen. The mixture is then diluted with 40 ml. of water and the solid which forms is collected by filtration and recrystallized from 80% ethanol to yield 1',4',5',6'-tetrahydropyrimidino[a-4,3]-17α-methyl - 4 - aza-5-androstene-17β-ol.

Similarly from testosterone and androstenedione there are obtained 1',4',5',6'-tetrahydropyrimidino[a-4,3]-4-aza-5-androstane-17β-ol and 1',4',5',6'-tetrahydropyrimidino-[a-4,3]-4-aza-5-androstene-17-one.

*Example 3*

A solution of 7.4 g. of 3,5-seco-4-norpregnane-5,20-dione-3-oic acid in 68 ml. of freshly distilled acetic anhydride is refluxed for two hours under an atmosphere of nitrogen. At the end of this time, 10 mg. of anhydrous sodium acetate are added and refluxing is continued for two additional hours. The solvent is then removed by evaporation under reduced pressure and the residue dissolved in benzene and ether. This solution is extracted two times with a dilute aqueous sodium carbonate solution and then washed with water. After drying over sodium sulfate, the solvent is removed by evaporation and the resultant solid crystallized from acetone to yield 4-oxa-5-pregnene-3,20-dione.

The solution of 4 g. of 4-oxa-5-pregnene-3,20-dione in benzene is treated with 10 g. of 1,3-propane-diamine for a period of three hours at room temperature. At the end of this time the reaction mixture is repeatedly washed with water to remove excess 1,3-propanediamine. The solution is then dried over sodium sulfate and the benzene removed by evaporation under reduced pressure. The resultant solid is dissolved in hot o-xylene and heated at reflux for one hour under an atmosphere of nitrogen. At the end of this time, the solvent is removed and the resultant solid crystallized from 80% ethanol to yield 1',4',5',6'-tetrahydropyrimidino[a-4,3]-4-aza - 5 - pregnene-20-one.

*Example 4*

9α-fluoro-16α-methylhydrocortisone is dissolved in a mixture of ethyl acetate and acetic acid. The mixture is cooled to −10° and two molar equivalents and ozone are bubbled through the solution. Ten milliliters of water and 1 ml. of 30% hydrogen peroxide are next added and the reaction mixture then allowed to stand at room temperature for 15 hours. Ether is added and the solution washed with water and extracted with dilute aqueous hydroxide. The combined alkaline extracts are then acidified with dilute hydrochloric acid and the solid which forms, collected by filtration, dissolved in ether and washed successively with water and a saturated aqueous solution of sodium chloride. This solution is washed and dried over sodium sulfate and concentrated. Addition of hexane then causes the formation of a solid which is collected by filtration and dried to yield 9α-fluoro-16α-methyl-3,5-seco-4-norpregnane - 5,20 - dione-11β-17α,21-triol-3-oic acid. This compound is then subjected to the procedure of Example 3, thus resulting in 1',4',5',6'-tetrahydropyrimidino[a-4,3]-9α-fluoro - 16α - methyl-4-aza-5-pregnene-20-one-11β,17α,21-triol.

In a similar fashion there is obtained from cortisone and cortisone 21-acetate the compounds 1',4',5',6'-tetrahydropyrimidino[a-4,3]-4-aza - 5 - pregnene-11,20-dione-17α,21-diol and 1',4',5',6'-tetrahydropyrimidino[a-4,3]-4-aza-5-pregnene-11,20-dione-17α,21-diol 21-acetate.

We claim:

1',4',5',6'-tetrahydropyrimidino[a-4,3]-4-aza - 5 - cholestene.

References Cited by the Examiner

Wertheim: Textbook of Organic Chemistry, pp. 763–764 (1945).

NICHOLAS S. RIZZO, *Primary Examiner.*

H. R. JILES, *Assistant Examiner.*